US012087070B2

(12) United States Patent
Hong et al.

(10) Patent No.: US 12,087,070 B2
(45) Date of Patent: Sep. 10, 2024

(54) SEQUENCE LABELING TASK EXTRACTION FROM INKED CONTENT

(71) Applicant: Microsoft Technology Licensing, LLC, Redmond, WA (US)

(72) Inventors: Jenna Hong, Acton, MA (US); Apurva Sandeep Gandhi, Union City, CA (US); Gilbert Antonius, San Ramon, CA (US); Tra My Nguyen, Brighton, MA (US); Ryan Serrao, Seattle, WA (US); Biyi Fang, Bellevue, WA (US); Sheng Yi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 366 days.

(21) Appl. No.: 17/454,729

(22) Filed: Nov. 12, 2021

(65) Prior Publication Data

US 2023/0154218 A1 May 18, 2023

(51) Int. Cl.
*G06F 40/284* (2020.01)
*G06V 10/22* (2022.01)
(Continued)

(52) U.S. Cl.
CPC ............ *G06V 30/36* (2022.01); *G06F 40/284* (2020.01); *G06V 10/22* (2022.01); *G06V 30/333* (2022.01); *G06V 30/412* (2022.01)

(58) Field of Classification Search
CPC ...... G06F 40/117; G06F 40/30; G06F 40/284; G06F 40/279; G06F 40/171; G06V 30/412; G06V 10/22; G06V 30/36; G06V 30/333
See application file for complete search history.

(56) References Cited

U.S. PATENT DOCUMENTS

| 11,435,893 B1* | 9/2022 | Cottle | G06V 30/1423 |
| 2014/0168716 A1* | 6/2014 | King | G06F 16/5846 |
| | | | 358/473 |

(Continued)

FOREIGN PATENT DOCUMENTS

EP  1655670 A2  5/2006

OTHER PUBLICATIONS

Bennett, et al., "Detecting action-items in e-mail", Proceedings of the 28th Annual International ACM SIGIR Conference on Research and Development in Information Retrieval, Aug. 15, 2005, pp. 585-586.

(Continued)

*Primary Examiner* — Congvan Tran
(74) *Attorney, Agent, or Firm* — Alleman Hall & Tuttle LLP

(57) ABSTRACT

A computer system is provided that includes one or more processors configured to receive user input for inked content to a digital canvas, and process the inked content to determine one or more writing regions. Each writing region includes recognized text and one or more document layout features associated with that writing region. The one or more processors are further configured to tokenize a target writing region of the one or more writing regions into a sequence of tokens, process the sequence of tokens of the target writing region using a task extraction subsystem that operates on tokens representing both the recognized text and the one or more document layout features of the target writing region, segment the target writing region into one or more sentence segments, and classify each of the one or more sentence segments as a task sentence or a non-task sentence.

20 Claims, 9 Drawing Sheets

(51) Int. Cl.
  *G06V 30/32* (2022.01)
  *G06V 30/412* (2022.01)

(56) References Cited

U.S. PATENT DOCUMENTS

| | | | |
|---|---|---|---|
| 2015/0095022 A1 | 4/2015 | Xu et al. | |
| 2018/0129944 A1* | 5/2018 | Meunier | G06N 20/00 |
| 2020/0257852 A1* | 8/2020 | Canton | G06F 40/151 |
| 2021/0279457 A1* | 9/2021 | Suyash | G06V 30/347 |
| 2023/0176728 A1* | 6/2023 | Thai | G06F 3/04847 |
| | | | 715/765 |

OTHER PUBLICATIONS

Gandhi, et al., "SLATE: A Sequence Labeling Approach for Task Extraction from Free-form Inked Content", In Repository of arXiv:2211.04454v1, Nov. 8, 2022, 12 Pages.

"International Search Report and Written Opinion Issued in PCT Application No. PCT/US22/040686", Mailed Date: Dec. 2, 2022, 12 Pages.

Wang, et al., "Context-Aware Intent Identification in Email Conversations", In Proceedings of the 29th ACM International Conference on Information & Knowledge Management, Jul. 18, 2019, pp. 585-594.

Ye, et al., "Learning to Parse Hierarchical Lists and Outlines Using Conditional Random Fields", In Proceedings of Ninth International Workshop on Frontiers in Handwriting Recognition, Oct. 26, 2004, 6 Pages.

"Miniconda", Retrieved from: https://web.archive.org/web/20190404081652/https://docs.conda.io/en/latest/miniconda.html, Apr. 4, 2019, 6 pages.

"PyTorch", Retrieved from: https://web.archive.org/web/20181021154439/https://pytorch.org/get-started/locally/, Oct. 21, 2018, 4 Pages.

"scikit learn", Retrieved from: https://web.archive.org/web/20121116182730/https://scikit-learn.org/stable/modules/generated/sklearn.semi_supervised.LabelPropagation.html, Nov. 16, 2012, 3 Pages.

Donahue, et al., "Enabling Language Models to Fill in the Blanks", In Repository of arXiv:2005.05339v2, Sep. 10, 2020, 10 Pages.

Fournier, Chris, "Evaluating Text Segmentation using Boundary Edit Distance", In Proceedings of the 51st Annual Meeting of the Association for Computational Linguistics, Aug. 4, 2013, pp. 1702-1712.

Lundberg et al., "SHAP", Retrieved from: https://github.com/slundberg/shap, Oct. 21, 2021, 22 Pages.

Lundberg, Scott, "Welcome to the SHAP documentation", Retrieved from: https://web.archive.org/web/20190613144240/https://shap.readthedocs.io/en/latest/, Jun. 13, 2019, 3 Pages.

Minixhofer, et al., "NNSplit", Retrieved from: https://github.com/bminixhofer/nnsplit, Jul. 23, 2021, 3 Pages.

* cited by examiner

INPUT: TARGET WRITING REGION SEQUENCE OF TOKENS 46

<.> CALL PETE </> TOMORROW SOUNDS LIKE A PLAN </> <.> CUT THE GRASS (40, 42, 64)

⬇

TEXT SENTENCE SEGMENTATION MODEL 68 (66)

⬇

LIST OF SENTENCE SEGMENTS IN THE TARGET WRITING REGION 72

1) CALL PETE
2) TOMORROW SOUNDS LIKE A PLAN
3) CUT THE GRASS

⬇

BINARY TASK CLASSIFICATION MODEL 70 (66)

⬇

OUTPUT: LIST OF TASK SENTENCES IN THE TARGET WRITING REGION 74

1) CALL PETE
2) CUT THE GRASS (52)

FIG. 3

SEQUENCE LABELING TASK EXTRACTION FROM INKED CONTENT

BACKGROUND

Video conferencing tools have become increasingly important with the current trends in remote work and remote learning. Many users value writing and drawing on a digital canvas to help think together and spark creativity. These users may work together to synthesize ideas on digital canvases (e.g., a digital whiteboard) during a synchronous meeting.

SUMMARY

A computer system is provided. The computer system may comprise one or more processors configured to receive user input for inked content to a digital canvas, and process the inked content to determine one or more writing regions. Each writing region may include recognized text and one or more document layout features associated with that writing region. The one or more processors may be further configured to tokenize a target writing region of the one or more writing regions into a sequence of tokens. The sequence of tokens may include tokens representing recognized text and tokens representing the one or more document layout features. The one or more processors may be further configured to process the sequence of tokens of the target writing region using a task extraction subsystem that operates on tokens representing both the recognized text and the one or more document layout features of the target writing region. The task extraction subsystem may be configured to segment the target writing region into one or more sentence segments and classify each of the one or more sentence segments as a task sentence or a non-task sentence. The one or more processors may be further configured to extract one or more sentence segments that have been classified as task sentences.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows an example of a multi-model implementation of a task extraction subsystem implemented by the computer systems of FIGS. 1A, 1B and 1D.

DETAILED DESCRIPTION

Current implementations of digital whiteboard and video conferencing tools enable users to input inked content onto a digital canvas. The inked content may be inputted using a digital stylus and touchscreen, mouse, or other input device that lays down digital ink along a path traversed by the user input device across the digital whiteboard as the user hand-manipulates the user input device, a process that may be referred to as being digitally handwritten. One challenge associated with this manner of input is translating the inked-form of such user-generated content on the digital canvas into follow-up tasks that may be input into a user's existing workflow. Currently, such translation has to be performed manually, which can be time consuming and subject to human error. Conventional computer-based task extraction approaches have been applied to typed text domains. Text domains, such as email, typically follow proper sentence and punctuation conventions. However, the inked-form of user-generated content on a digital canvas may potentially be informally written, and may not follow the same sentence and punctuation conventions. Thus, many of these current task extraction approaches may potentially be inaccurate in performing task extraction in the inked-content domain. Thus, a technical challenge exists in automating task extraction from input that may follow unconventional and/or irregular formatting conventions, such as inked content on digital canvases.

Figure 1A:
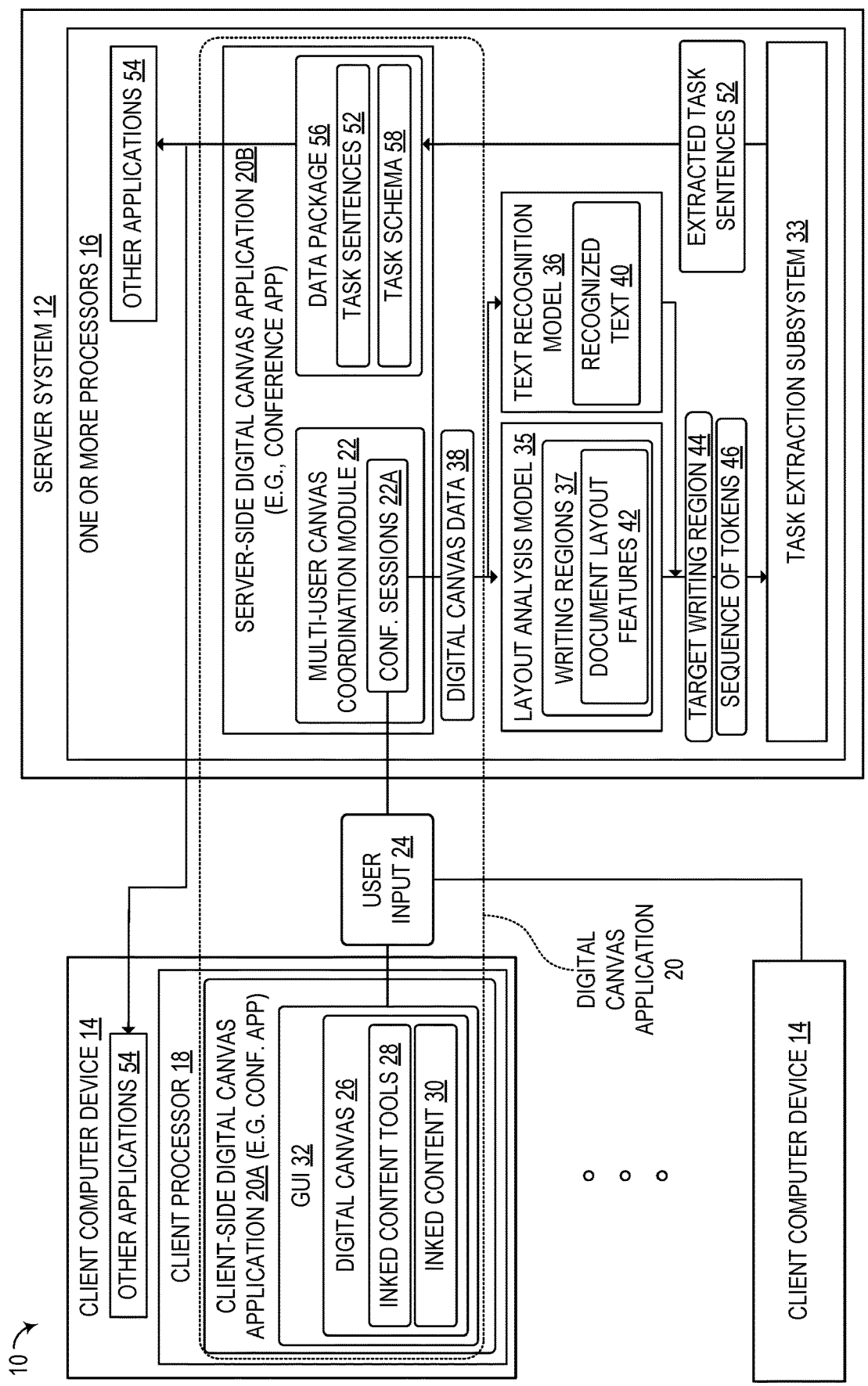
FIG. 1A shows a schematic view of a server-based computer system for implementing a task extraction subsystem for extracting tasks from inked content that may be drawn onto a digital canvas by users, according to one embodiment of the present disclosure featuring a plurality of client computer devices and a server system.
Figure 1B:
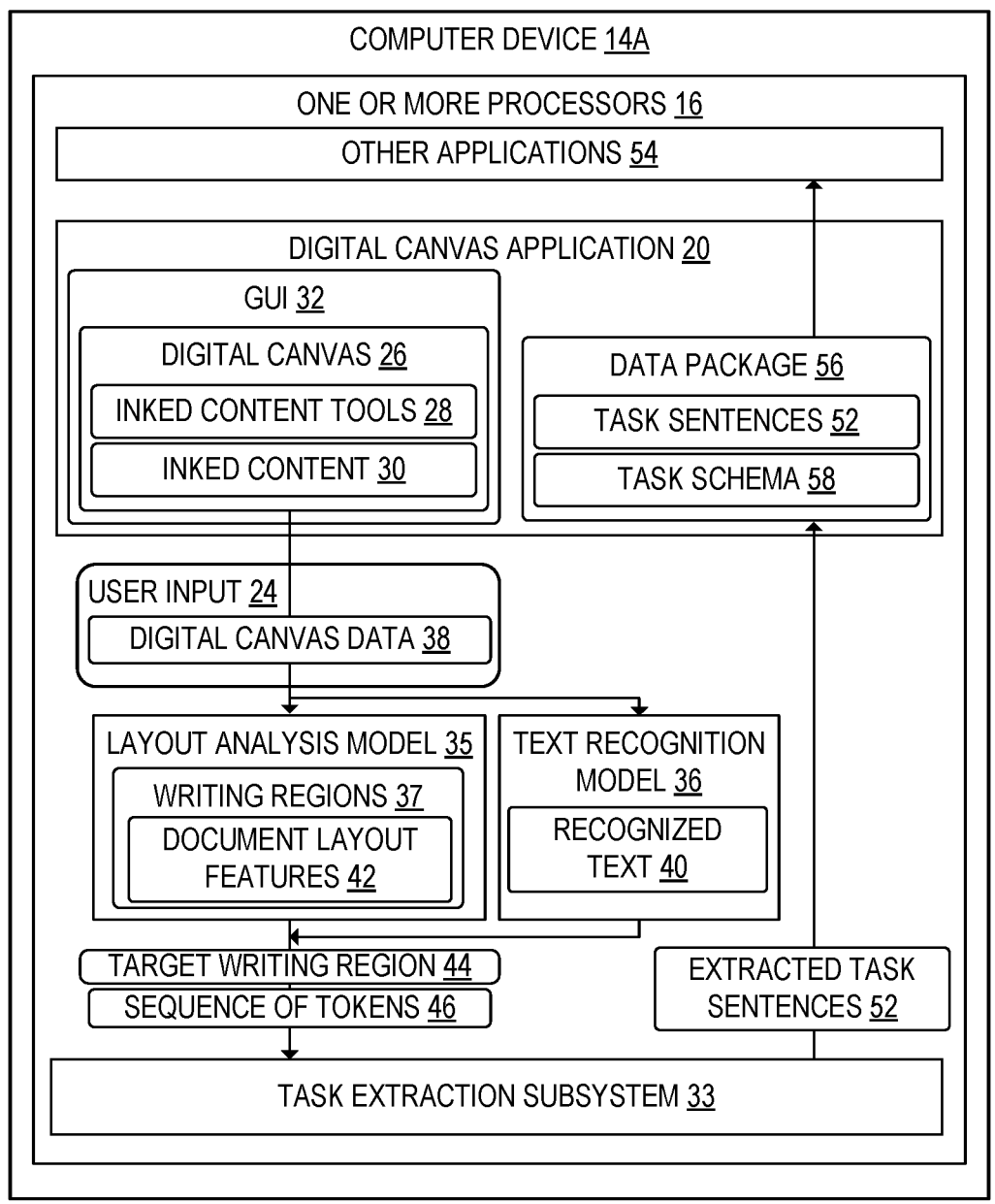
FIG. 1B shows a schematic view of a computer device for implementing a task extraction subsystem for extracting tasks from inked content that may be drawn onto a digital canvas by users, according to another embodiment of the present disclosure.

To address these issues, FIGS. 1A and 1B illustrate an example computer system 10 that implements a task extraction subsystem for extracting tasks from inked content that may be drawn onto a digital canvas by users. The implemented model is trained for both accurate sentence segmentation and task sentence classification on inked content. The approach described herein provides the potential benefit of performing sentence segmentation and task sentence classification with low latency, which may be particularly useful for building systems that can detect inked tasks and output structured data indicative of those tasks to programs used by end-users in real time.

As will be discussed in more detail below, the task extraction subsystem may provide these potential benefits for scenarios where users are inking tasks on a digital canvas or whiteboard in a collaborative meeting scenario (such as during a digital conference call), creating a personal to-do list, assigning tasks to groups (e.g., in breakout rooms in the education setting), etc. However, it should be appreciated that the techniques described herein may be used in any inked-content scenario to programmatically extract task sentences from the user-generated inked-content. Further, the approaches described herein may also be extended and applied to other domains such as extracting tasks from typed meeting notes, emails, transcripts of meeting audio and voice recordings, etc., and may provide similar potential benefits of low-latency task extraction to these domains.

FIG. 1A illustrates a server-based computer system 10, while FIG. 1B illustrates a computer device 14A in which processing is performed at a single device rather than being distributed among multiple client and server devices. Turning now to FIG. 1A, computer system 10 is illustrated that may include a server system 12 and one or more client computer devices 14. The server system 12 may be configured to communicate with the one or more client computer devices 14 over a computer network, such as, for example, a wide area network (WAN). The server system 12 may include one or more server devices that include one or more processors 16. In one example, the server system 12 may include a plurality of server devices configured to operate in a cloud computing configuration to perform the functions of the server system 12 described herein. Each server device of the server system 12 may include other suitable computer components, such as, for example, volatile memory devices, non-volatile memory devices, etc. In a single user scenario, the functions of the server system 12, such as the task extraction techniques that will be described in more detail below, may be performed by a user's computer device.

The one or more client computer devices 14 may include client processors 18, input and output devices, volatile and non-volatile storage devices, and other suitable computer components. For example, each client computer device 14 may include input devices such as, for example, a mouse and keyboard, a microphone, a touch screen, digital stylus, etc., and output devices such as, for example, speakers, displays, etc. The client devices 14 may take any suitable form of personal computer device such as laptop computer devices, desktop computer devices, mobile phone devices, tablet computer devices, wearable computer devices, gaming console devices, etc.

The client processors 18 of the client computer devices 14 may collectively be configured to execute respective client- and server-side components of a digital canvas application 20. The digital canvas application 20 may include a client-side digital canvas application 20A executed by the client processor 18 that is configured to communicate with a server-side digital canvas application 20B executed by the one or more processors 16 of the server system 12. The digital canvas application 20 may be referred to as a distributed digital canvas application in this embodiment, as it is executed on multiple different machines communicating across a network. The digital canvas application 20 may be, for example, a digital conferencing application with a conference whiteboard tool that may be concurrently used by a plurality of users participating in an online conference, a stand-alone whiteboard application used by a single user or multiple users at a single computing device, a notepad application, a word processing application, or other application program that is configured to receive digital ink as input.

The client-side digital canvas application 20A may be configured to present a graphical user interface (GUI) 32 for the digital canvas application 20, and receive user input 24 that is sent to the server-side digital canvas application 20B at the server system 12 over the computer network. GUI 32 may be configured to display a digital canvas 26 of the digital canvas application 20. The digital canvas 26 may include inked content tools 28 by which users may create inked content 30 in the digital canvas. By selecting and operating the inked content tools 28 afforded by the digital canvas 26, the user may generate user inked content 30 on the digital canvas 26, which, for example, may take the form of a digital whiteboard. Although the GUI 32 and digital canvas 26 are shown as executed by the client-side digital canvas application 20A, it will be appreciated that a thin client model may be adopted and the code to implement the GUI 32 and digital canvas 26 may be executed on the server system 12. In yet other examples, the digital canvas application 20 and the digital canvas 26 may not be distributed between a client computer device 14 and a server system 12, but may be executed on a computer device 14A, as illustrated in FIG. 1B, discussed below.

Continuing with FIG. 1A, the server-side digital canvas application 20B executed by the one or more processors 16 of the server system 12 may include one or more conference sessions 22A, each of which features one or more associated users of respective client computing devices 14 connected to a multi-user canvas coordination module 22 of the server-side digital canvas application 20B to interact with on a shared digital canvas. Each conference session 22A is managed by the multi-user canvas coordination module 22, which is configured to receive digital canvas input data 38 from each of the one or more client computer devices 14 connected to a conference session 22A, and synchronize the display of the inked content 30 received from each user in the conference session 22A via the respective instance of the digital canvas 26 displayed at each respective client computing device 14. To achieve this, the digital canvas 26 instance displayed on each client computing device 14 for a given conference session 22A has a shared state that is managed by the multi-user canvas coordination module 22. User input 24 for inked content 30 from any of the one or more users in the conference session is sent from each client computer device 14 to the multi-user canvas coordination module 22 at the server system 12 and incorporated into the shared state of the shared digital canvas 26. The updated shared state of the shared digital canvas 26 for each conference session 22A is transmitted to each client computing device 14, which in turn displays the inked content 30 newly received from each user on the display of each client computer device 14. In this way, the GUI 32 on each respective client computing device 14 associated with a given conference session 22A, under control of the multi-user canvas coordination module 22, visually presents a shared version of the digital canvas 26 to the one or more users of the client computer devices 14.

In some scenarios, the one or more users of the client computer devices 14 may generate user inked content 30 that includes tasks or to-do items. For example, one user may write "finish demo deck by Friday" on the digital canvas as a task that should be completed. The user may also want that task item to be transferred to be reproduced in other applications, or presented in locations other than the digital canvas 26, such as, for example, on a calendar. However, as discussed above, typical task extraction techniques may be inoperable in this context or may be inaccurate when extracting tasks from inked content. For example, a major challenge of working with inked content is that it is often written in a casual style, lacking punctuation, proper grammar, capitalization, verbosity, and spelling correctness. These issues may potentially cause accurate modeling to be difficult as conventional sentence segmentation often relies on punctuation and capitalization to determine the starts and ends of sentences. Similarly, misspelled words, acronyms, and improper grammar may cause potential challenges for a machine learning model to make sense of the meaning of the sentence and thus classify the sentence as a task or non-task sentence.

Figure 1C:
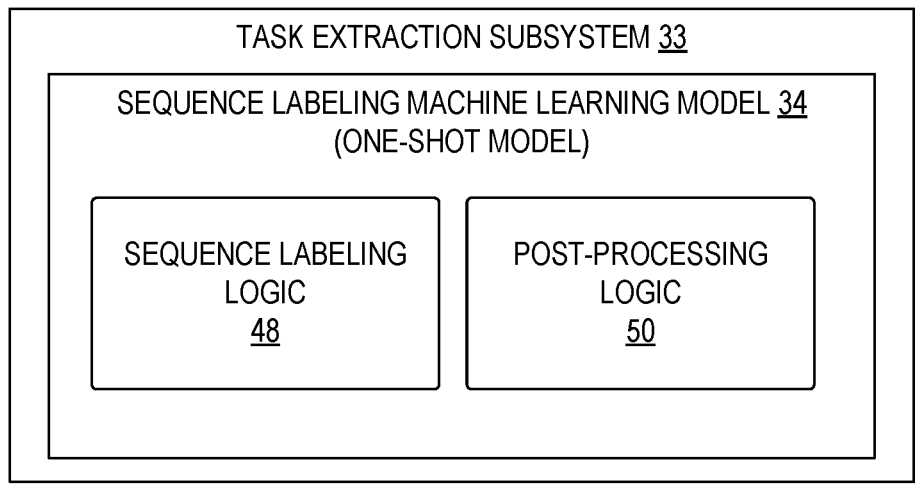
FIG. 1C shows a schematic view of a task extraction subsystem of the computer systems of FIGS. 1A and 1B, implementing a one-shot sequence labeling machine learning model.
Figure 1D:
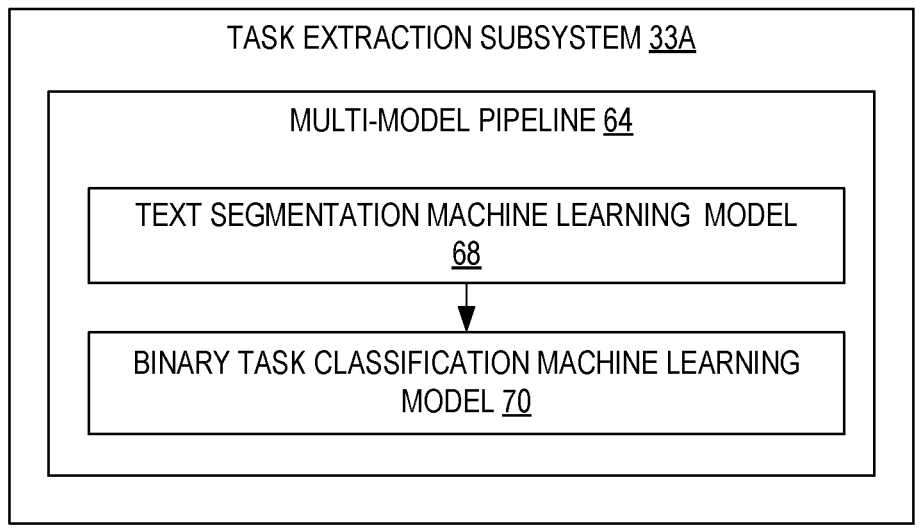
FIG. 1D shows a schematic view of a task extraction subsystem of the computer system and device of FIGS. 1A and 1B, implementing a multi-model pipeline including a text segmentation machine learning model and a binary task classification machine learning model.

Thus, to address these issues, the server system 12 of FIG. 1A implements task extraction subsystem 33 configured to extract tasks from inked content. In one example, the task extraction subsystem 33 may take the form of a single low-latency model that is trained for both accurate sentence segmentation and task sentence classification on inked content. Thus, as shown in FIG. 1C, task extraction subsystem 33 may implement a sequence labeling machine learning model 34, which is configured as a one-shot model that outputs a classification directly based on input. In another example, task extraction subsystem 33 may take the form of a multi-model approach that includes separate models for performing sentence segmentation and task sentence classification. Thus, as shown in FIG. 1D, task extraction subsystem 33A may implement a multi-model pipeline 64 including, in a processing order, a text segmentation machine learning model 68 configured to output a segmentation result to a binary task classification machine learning model 70, which in turn outputs a task classification result.

As used herein, sequence labeling is an approach to natural language processing (NLP) tasks that predicts a label for each token within a sequence, rather than a label for the whole sequence. The single model example of task extraction subsystem 33 shown in FIG. 1C uses a single-stage sequence labeling implementation to extract both task and non-task sentences from inked content. One important feature leveraged by the sequence labeling machine learning model 34 to extract task and non-task sentences is the use of document layout information such as bullets and line breaks. Using document layout information to compensate for the relative lack of structure in inked content compared to more formal content such as email content may provide the potential benefit of increasing accuracy of the sequence labeling machine learning model 34 for extracting task and non-task sentences from inked content compared to conventional implementations.

It should be appreciated that techniques described herein for the sequence labeling machine learning model 34 may also be applied to other domains, such as, for example, the Automatic Speech Recognition (ASR) domain which faces some similar challenges to the inking domain where transcribed spoken content may not be as well-structured as typed content (lacking grammar or punctuation clues). For example, an ASR-adapted sequence labeling machine learning model 34 may leverage domain-specific information (e.g., including long pauses between spoken words as special tokens in the model input) in the same/similar manner as the document layout information of the inked domain, such as bullets and line breaks, described herein.

In one example, the sequence labeling machine learning model 34 may implement or leverage a transformer neural network architecture such as the architecture of Robustly Optimized Bidirectional Encoder Representations from Transformers approach (RoBERTa). The pretrained transformer language models are fine-tuned to consider document layout features, such as bullet points, and trained for task vs non-task classification. The RoBERTa-based transformer architecture may provide potential benefits over other approaches that use Bidirectional Encoder Representations from Transformers (BERT) embeddings, or prior generation natural language processing techniques such as recurrent neural network with long short-term memory (LSTM) gates, etc.

Most previous works on sequence labeling use bi-directional long short-term memory (Bi-LSTM) and conditional random field (CRF) layers in the model architectures. For example, these Bi-LSTM and CRF approaches often require large labeled datasets to be trained from scratch, which may be particularly difficult to obtain for the inked content domain.

As will be described in more detail below, the sequence labeling approach of the sequence labeling machine learning model 34 treats an input writing region as a sequence of tokens (or sub-words), and classifies each token as being part of one of a predetermined set of classes. To extract sentences for sentence segmentation and task sentences for task extraction, the model further performs a post-process step on the sequence of tokens according to their predicted class labels. Several different sequence labeling schemes will be described herein. Each particular sequence labeling scheme determines the set of classes and the logic to post-process the predicted token-level class labels for entity extraction.

As illustrated in FIG. 1A, the one or more processors 16 may be configured to process the inked content 30 using layout analysis model 35 to determine one or more writing regions 37. The layout analysis model 35 may be configured to received digital canvas data 38 in user input 24 from the client-side digital canvas application 20A that includes the user inked content 30. The layout analysis model 35 may be configured to associate a group of one or more strokes in the inked content 30 with each of the determined writing regions 37. In one example, a clustering algorithm may be used by the layout analysis model to group the strokes together into writing regions 37. The layout analysis model 35 may also be trained to recognize document layout features 42, such as, for example, a line break, a bullet point, and an indent within the strokes that make up each of the writing regions 37. While logically each writing region 35 may be defined by one or more strokes that have been grouped by the layout analysis model 35, it will be appreciated that visually each writing region 37 may spatially contain a group of inked words, phrases or other text that are associated and intended to be read together by the user.

Further, a text recognition model 36 may be provided and configured to receive the inked content in the digital canvas data. For example, the inked content for each writing region may be sent to the text recognition model 36 for recognition. The text recognition model 36 may be trained to parse handwriting in the user inked content 30, and generate text data corresponding to the strokes that are associated with each of the writing regions 37. Collectively, the layout analysis model 35 and text recognition model 36 may generate representations of each writing region 37, include recognized text 40 and one or more document layout features 42 associated with that writing region 37.

The one or more processors 16 may be configured to tokenize a target writing region 44 of the one or more writing regions 37 into a sequence of tokens 46. The sequence of tokens 46 includes tokens representing recognized text 40 and tokens representing the one or more document layout features 42. For example, a line break document layout feature may be represented by the token "</>", and a bullet point document layout feature may be represented by the token "<.>". It should be appreciated that any suitable token may be used to represent the one or more document layout features.

The task extraction subsystem 33, either by the sequence labeling machine learning model 34 or by the text segmentation machine learning model 68, may be trained to recognize these special tokens that represent the document layout features, such as the line break and bullet point layout features. For example, the sequence labeling machine learning model 34 or text segmentation machine learning model 68 may be trained to correlate a token for the line break with a sentence boundary, and may be trained to correlate a token for the bullet point with a start of a task sentence.

As illustrated in FIG. 1A, the task extraction subsystem 33 may be configured to receive the sequence of tokens 46 for the target writing region 44. The task extraction subsystem 33 may process the sequence of tokens 46 of the target writing region 44. The task extraction subsystem 33 is configured to operate on both the recognized text 40 and the one or more document layout features 42 of the target writing region 44 using sequence labeling logic 48 and post-processing logic 50 of the sequence labeling machine learning model 34, or using the text segmentation machine learning model 68 and binary task classification machine learning model 70 of the multi-model pipeline 64, to thereby segment the target writing region 44 into one or more sentence segments and classify each of the one or more sentence segments as a task sentence or a non-task sentence. Several example approaches for the sequence labeling logic 48 and the post-processing logic 50 will be described in more detail below.

The task extraction subsystem 33 may be configured to extract one or more sentence segments that have been classified as task sentences 52, and present the one or more sentence segments that have been classified as task sentences 52 to the users of the client computer devices 14. In one example, the extracted task sentences 52 may be presented via the GUI 32 of the digital canvas application 20. In another example, the extracted task sentences 52 may be provided to other applications 54 executed by the server system 12 and/or the client computer devices 14. For example, the one or more processors 16 of the server system 12 may be configured to generate data packages 56 for the one or more sentence segments that have been classified as task sentences 52.

The data packages 56 may include the task sentences 52 extracted from the target writing region, and may also include a task schema 58 readable by other applications 54. The task schema 58 may indicate a content of the one or more sentence segments classified as task sentences, and may include metadata that is usable by the other applications 54, such as, for example, a user profile for the user that wrote the task sentence, a time that the task sentence was extracted, etc. The data packages 56 may be sent to the other applications 54 executed by the server system 12, the client computer devices 14, or other computer devices of the computer system 10. As a few non-limiting examples, the other applications 54 may include types of applications such as a calendar application, an email application, a messaging application, a reminder application, a notes application, a to-do list application, etc. It should be appreciated that any application that has been configured to ingest the task schema 58 of the data packages 56 may receive and use the data packages 56.

FIG. 1B illustrates another embodiment of the present disclosure featuring a computer device 14A configured to execute the digital canvas application 20, other applications 54, text recognition model 36, and sequence labeling machine learning model 34. It will be appreciated that computer device 14A may be a stand-alone device, and is not required to be communicating with a server system via a computer network. Alternatively, the computer device 14A maybe communicating with other computer devices 14A in a peer-to-peer networking configuration, or may communicate with a server device only when network connectivity is present, for example. In the embodiment of FIG. 1B, components with like numbers perform similar functions to those described above, except where described differently below. For example, GUI 32 of computer device 14A, which features a digital canvas 26 configured to receive inked content 30 from a user using inked content tools 28, is displayed by the computer device 14A on a display associated therewith. User input received via the GUI 32 is passed to layout analysis model 35 and text recognition model 36 executed by the one or more processors 16 of the computer device 14A, which in turn identify the writing regions 37, recognized text 40, and document layout features 42. The layout analysis model 35 extracts metadata representing each target writing region 44, and combines this metadata with text recognized by the text recognition model 40 to thereby output a sequence of tokens 46, which are passed to the task extraction subsystem 33, which extracts extracted task sentences 52 as described above. These are in turn returned to the digital canvas application 20, and may be displayed via a GUI 32 or output as a data package 56 including task sentences and an associated task schema 58, to other applications 54 executed on the computer device 14A. The configuration of FIG. 1B may be useful for mobile processing when a computer network connection is not available, enabling extraction of tasks even when a server system is not available for remote processing. As another example benefit of such a configuration, round trip time for communication with a server may be avoided, rendering extracted task sentence results to the user more quickly in conditions with slow network connectivity.

Figure 2:
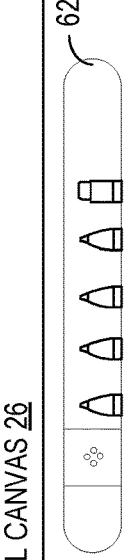
FIG. 2 shows an example conference application and digital canvas that includes inked content received from one or more users that has been processed to extract example task sentences, implemented by the computer systems of FIGS. 1A and 1B.

FIG. 2 illustrates an example GUI 32 of a digital canvas application 20 in the form of a conference application 20' executed by the server system 12. The conference application 20' may include a digital canvas 26, which takes the form of a digital whiteboard in this example. The conference application 20' is running a conference session 22A that hosts a plurality of users 60. Using the digital canvas 26, the plurality of users 60 may enter user input to create inked content 30. In the illustrated example, the digital canvas 26 includes a plurality of inking tools 62 that may be selected by the users 60 to draw on the digital canvas 26.

In the illustrated example, the users 60 have generated inked content 30 for two different writing regions 37. Each writing region 37 includes associated text that is grouped together in that region. In this particular example, the content of the two writing regions 37 have separate contexts. As discussed previously, the digital canvas data 38 for the inked content 30 created by the users 60 is sent to text recognition model 36 that performs handwriting recognition and document layout analysis to identify the different writing regions 37. The recognized text 40 and document layout features 42 for each writing region are tokenized into sequences of tokens 46, and then processed by the sequence labeling machine learning model 34.

Using the techniques described herein, the task extraction subsystem 33 extracts the task sentences 52. The extracted task sentences 52 from the writing regions 37 of the user inked content 30 may then be presented to the plurality of users 60 via the GUI 32 of the conference application 20'. As discussed above, the extracted task sentences 52 may also be packaged into data packages 56 and sent to other applications 54, such as, for example, a calendar application for each of the plurality of users 60 so that the extracted tasks may be surfaced to those users.

Figure 4:
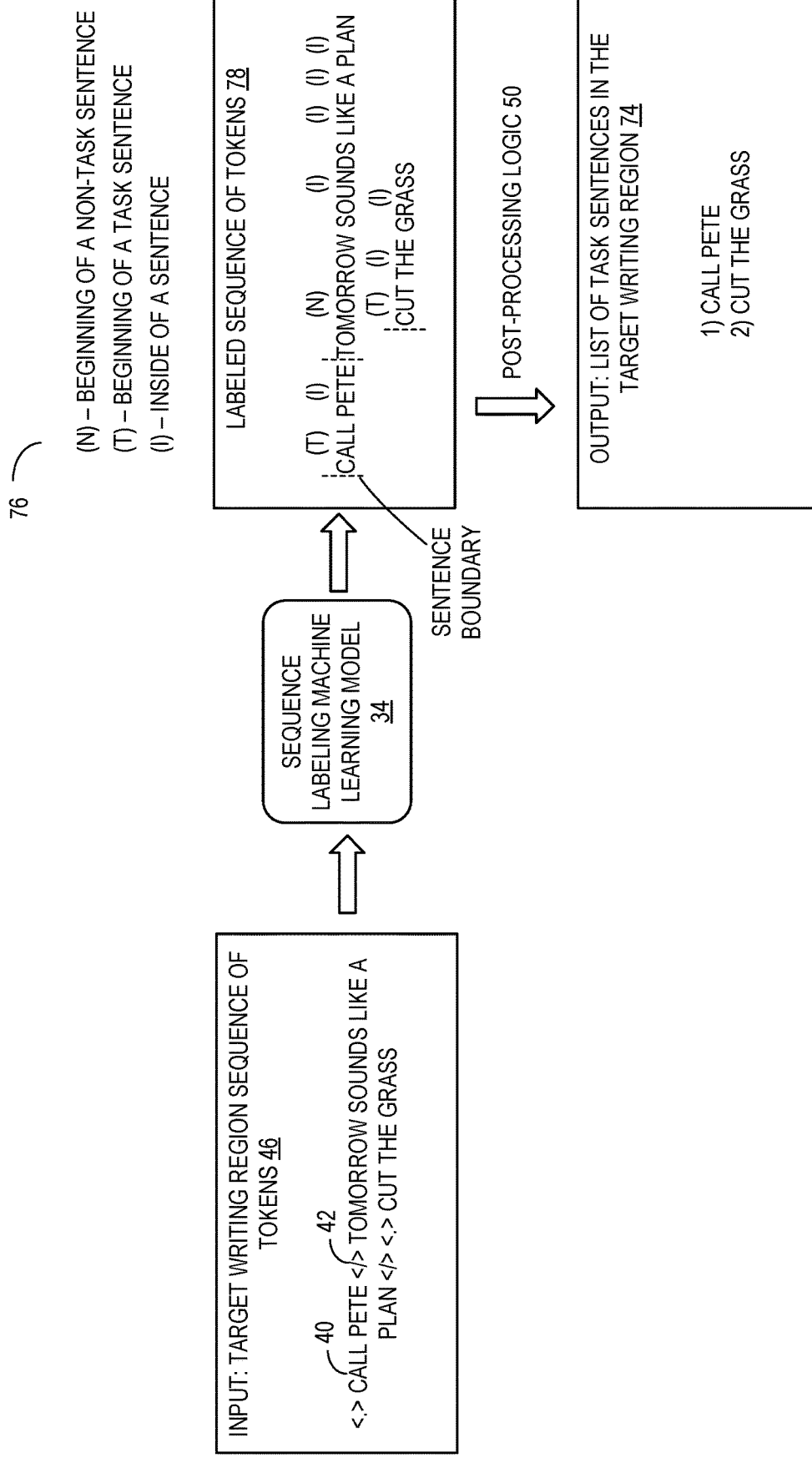
FIG. 4 shows an example of a one-shot implementation of a sequence labeling machine learning model by the task extraction subsystem implemented by the computer systems of FIGS. 1A, 1B and 1C.
Figure 5:
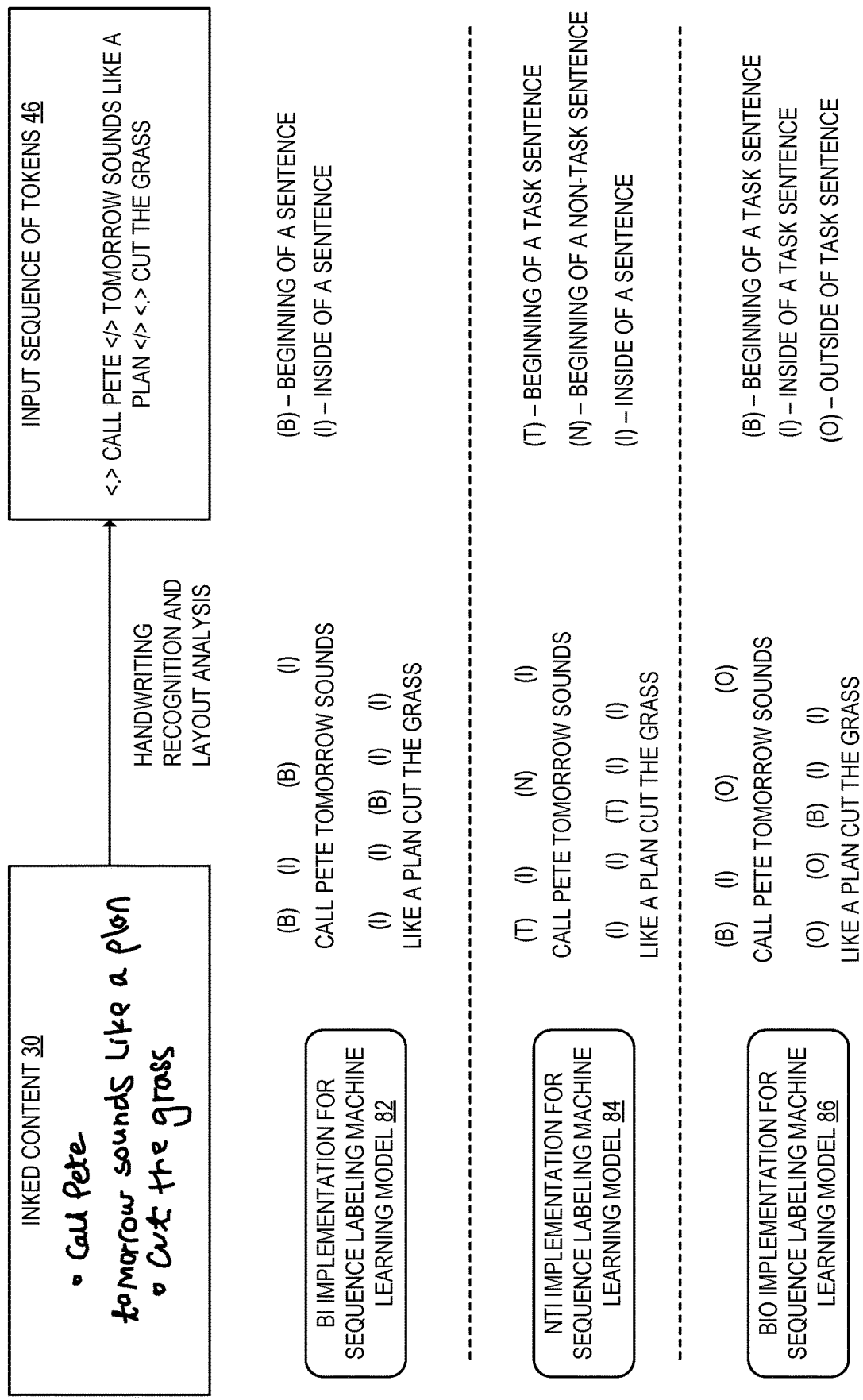
FIG. 5 shows three examples of sequence labeling schemes for the task extraction subsystem implemented by the computer systems of FIGS. 1A and 1B.

FIG. 3-5 show several examples of particular sequence labeling logic 48 and post-processing logic 50 that may be implemented by the task extraction subsystem 33 to extract the task sentences 52.

FIG. 3 shows an example where the task extraction subsystem 33 includes a multi-model pipeline 64 of two or more machine learning models 66 that includes at least a text segmentation machine learning model 68 and a binary task classification machine learning model 70, as discussed earlier in relation to FIG. 1D. The text sentence segmentation model 68 may be configured to receive an input of a sequence of tokens 46 for a target writing region 44. As illustrated, the sequence of tokens 46 includes tokens representing both recognized text 40 and document layout features 42. The token representations of the document layout features 42 are technically useful for performing text sentence segmentation of the inked content 30 for the approaches of FIGS. 3-5. Specifically, one of the challenges of performing task extraction with inked content is that inked content is often written in a casual style, lacking punctuation, proper grammar, capitalization, verbosity, and spelling. To compensate for these issues of the inking domain, the approaches of FIGS. 3-5 supplement the input to the sequence labeling machine learning model with document layout metadata 42. Particularly, the following types of document layout features 42 may be recognized and represented with tokens in the input to the model.

1) Line Breaks: Line breaks may be used as indicators for where a document line ends and a new one begins. While line breaks to do not necessarily correspond exactly to sentence boundaries, there is a strong correlation between their positions. Thus, the techniques illustrated in FIGS. 3-5 may use line breaks as a signal to the model for sentence segmentation purposes. In the illustrated example, the '</>' token is used to represent a line break document layout feature in the sequence of tokens 46.

2) Bullet points: People may tend to write tasks in the form of to-do lists. Thus, it may be common for tasks to be bulleted, particularly in inked content. Furthermore, bullet points may typically be used to indicate the start of a new sentence. As bullet points may be highly correlated to both tasks and beginning of sentences, the techniques illustrated in FIGS. 3-5 may be configured to use the bullet point document layout feature as a signal for identifying the start of task sentences. In the illustrated example, the <.>' token is used to represent a bullet point document layout feature in the sequence of tokens 46.

It should be appreciated that the two types of document layout features described above are merely exemplary, and that the approaches of FIGS. 3-5 may use any other suitable type of document layout feature, such as, for example, line indents.

Turning back to FIG. 3, the text sentence segmentation model 68 may be configured to identify sentence boundaries in the sequence of tokens 46 based at least on the document layout features 42. The text sentence segmentation model 68 may process the sequence of tokens 46 to extract one or more sentence segments. A list 72 of example sentence segments is shown in FIG. 3, including the sentences "Call Pete", "tomorrow sounds like a plan", and "cut the grass". These sentence segments were identified for the target writing region shown in FIG. 2.

The extracted sentence segments are sent to the binary task classification model 70, which is trained to classify each extracted one or more sentence segments as a task sentence or a non-task sentence. FIG. 3 shows an example list 74 of extracted tasks sentences 52 from the target writing region. As shown, the extracted task sentences 52 include "Call Pete" and "Cut the grass". On the other hand, the sentence "tomorrow sounds like a plan" was identified as a non-task sentence, and thus is not included in the extracted task sentences 52.

FIG. 4 illustrates an example approach where the task extraction subsystem 33 includes a sequence labeling machine learning model 34 that is a one-shot machine learning model, which both segments and classifies the target writing region into one or more task sentences and non-task sentences, as discussed earlier in relation to FIG. 1C. The approach of FIG. 4 utilizes multi-task learning techniques, which involve training a single, shared model to perform multiple tasks. Specifically, the sequence labeling machine learning model 34 is a one-shot model that performs multiple tasks. Multi-task learning may provide the potential benefits of being more data-efficient and less prone to overfitting to any single task compared to multi-model approaches.

The same input of a sequence of tokens 46 is used by the sequence labeling machine learning model 34 as in FIG. 3. However, instead of a two-step process of extracting sentence segments and then classifying those extracted sentence segments, the approach of FIG. 4 performs those steps jointly. To achieve this multi-task learning feature, the sequence labeling machine learning model 34 in the approach of FIG. 4 is configured to perform a sequence labeling process. In the specific sequence labeling process of FIG. 4, the sequence labeling machine learning model 34 may be trained to label one or more tokens of the sequence of tokens 46 of the target writing region with one of at least three labels 76. In this specific approach, referred to herein as the NTI approach, the three labels 76 include (N) a beginning of non-task sentence label, (T) a beginning of a task sentence label, and (I) an inside of a sentence label. The sequence labeling machine learning model 34 is trained to label each word that starts a non-task sentence with an (N) label, each word that start a task sentence with a (T) label, and each word that lies within a sentence with an (I) label regardless of whether that sentence is within a task or non-task sentence.

FIG. 4 shows an example labeled sequence of tokens 78 generated using this approach for the target writing region of FIG. 2. As shown, after labeling, the entire sequence of tokens 78 can be efficiently parsed into the task and non-task sentences using post-processing logic. Specifically, the post-processing logic 50 may include logic to aggregate predicted token-level labels to word-level labels. Next, a sequence of word labels that starts with a (T) and ends in zero or more (I) labels indicates a task sentence, whereas a sequence of word labels that starts with a (N) and ends in zero or more (I) labels indicates a non-task sentence. These task sentences may be extracted using the post-processing logic 50, and surfaced (i.e., output) to the users 60 using the techniques described above. FIG. 4 shows an example list of task sentences 74 that have been extracted from the target writing region of the example shown in FIG. 2.

FIG. 5 shows examples of three different labeling approaches for extracting task sentences and non-task sentences. The BI implementation 82 for the sequence labeling machine learning model 34 may be implemented by the two-step model of FIGS. 1D and 3. The NTI implementation 84 is shown in FIG. 4, and may be implemented by a one-shot sequence labeling machine learning model 34 of FIG. 1C. The BIO implementation 86 is an alternative implementation that may be implemented by the one-shot sequence labeling machine learning model 34 of FIG. 1C.

All three illustrated examples are operating on inked content 30 of the target writing region 44 from the example of FIG. 2. The inked content 30 is tokenized into the sequence of tokens 46 that includes tokens representing both the recognized text and document layout features of the target writing region. The same sequence of tokens 46 are passed to all three example implementations 82, 84, and 86 for the sequence labeling machine learning model 34.

The BI implementation 82 may be used for sentence segmentation, i.e., the desired entities extraction from the input text are sentences. In this labeling scheme, tokens are assigned one of two labels: (B)—Beginning of Sentence; (I)—Inside of Sentence. As shown, in the BI implementation 82, the task extraction subsystem 33, specifically the text sentence segmentation model 68 of the multi-model pipeline 64, may be configured to label one or more tokens of the sequence of tokens 46 of the target writing region with one of at least two labels including a beginning of sentence label and an inside of sentence label.

The text sentence segmentation model 68 may then process the labeled sequence of tokens to extract one or more sentence segments. Specifically, the text sentence segmentation model 68 may be configured to aggregate token-level class labels to word-level labels to help prevent split sentences in the middle of words. The words labeled as (B) indicate the beginning of a new sentence, which provides the predicted sentence boundaries for sentence segmentation. The extracted text sentences may then be sent to the binary task classification model 70 for classification into task and non-task sentences.

The BIO implementation 86 is a sequence label approach that may be used to jointly segment text into sentence and classify the sentences as task or non-task. In this labeling scheme each token of the sequence of tokens 46 is labeled with one of the following three labels: (B)—Beginning of Task Sentence; (I)—Inside of Task Sentence; (O)—Outside of Task Sentence. Specifically, the sequence labeling machine learning model 34 may be configured to label one or more tokens of the sequence of tokens 46 of the target writing region with one of at least three labels including a beginning of task sentence label, an inside of task sentence label, and an outside of task sentence label. Next, similarly to the BI implementation 82, post-processing logic 50 may be used to aggregate predicted token-level labels from the model to word-level labels. Then, a sequence of word labels that starts with a 'B' and ends in zero or more 'I' labels indicates a task sentence. The sequence labeling machine learning model 34 may process the labeled sequence of tokens to extract the one or more sentence segments that have been classified as task sentences 52.

In some examples, it may be valuable to segment a contiguous block of non-task sentences into separate non-task sentences. The NTI implementation 84, which is also shown in FIG. 4 may be used to address this issue. The NTI implementation 84 is a labeling scheme which allows the model to not only extract task sentences but non-task sentences as well. Thus, the NTI implementation 84 provides the potential benefit of training a sequence labeling machine learning model 34 to be used both as a task sentence extraction model and a sentence segmentation model. Therefore, training a model with the NTI implementation 86 is a form of multi-task learning, and may provide the potential benefits discussed above. The NTI implementation 86 includes a label scheme that assigns to each token, one of the following three labels: (N)—Beginning of a Non-Task sentence; (T)—Beginning of a Task Sentence; (I)—Inside of a Sentence. Specifically, the sequence labeling machine learning model 34 is trained to label one or more tokens of the sequence of tokens 46 of the target writing region 44 with one of at least three labels including a beginning of non-task sentence label, beginning of a task sentence label, and an inside of a sentence label.

Similar to the other implementations, the predicted token-level labels are aggregated word-level labels. A sequence of word labels that starts with a 'T' and ends in zero or more 'I' labels indicates a task sentence, whereas a sequence of word labels that starts with a 'N' and ends in zero or more 'I' labels indicates a non-task sentence. The sequence labeling machine learning model 34 may perform post-processing logic 50 to process the labeled sequence of tokens to extract the one or more sentence segments that have been classified as task sentences 52. Similarly, the sequence labeling machine learning model 34 may also extract the non-task sentences if needed.

Figure 6:
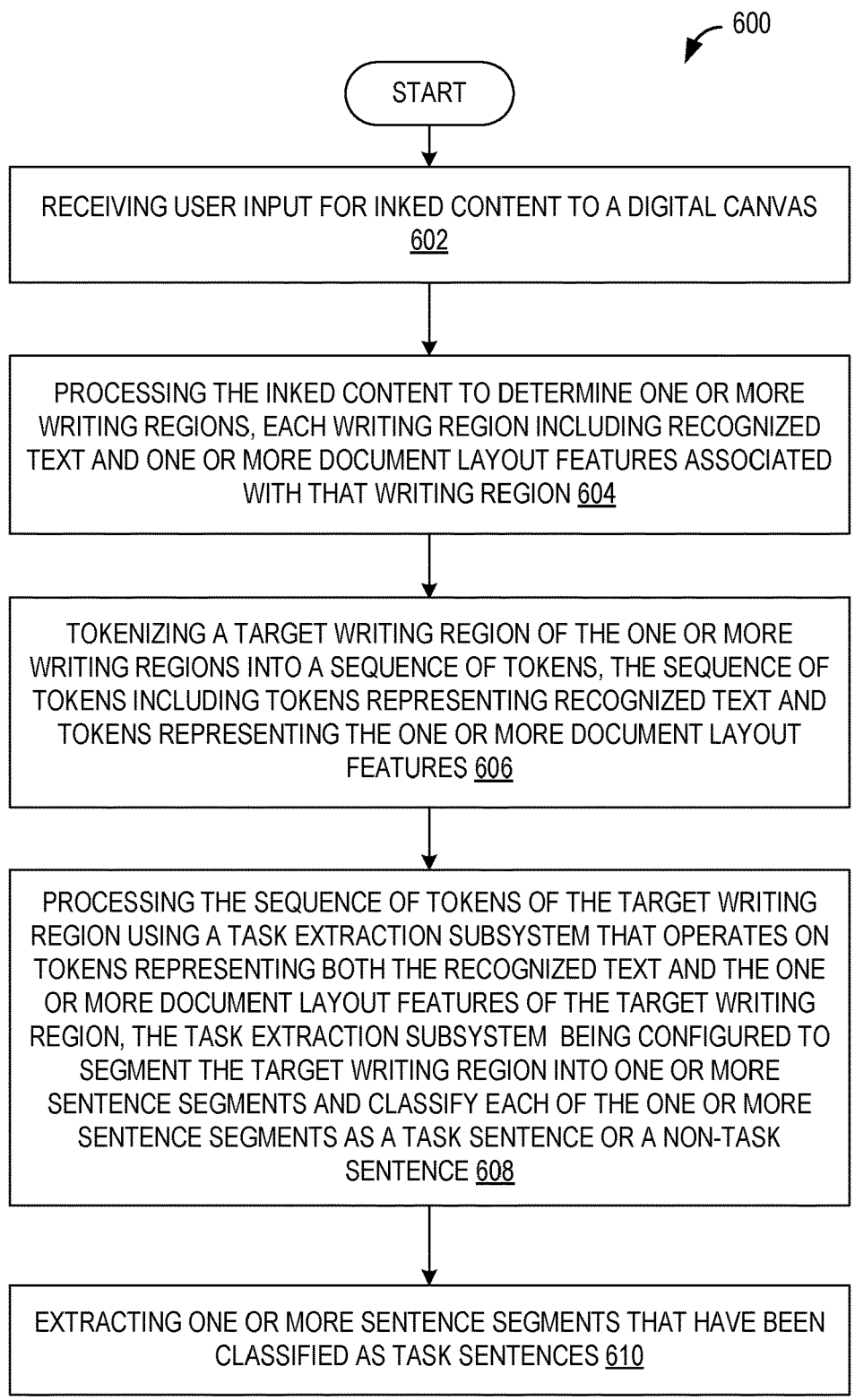
FIG. 6 shows a flowchart of an example method for extracting tasks from inked content that may be drawn onto a digital canvas by users.

FIG. 6 shows a flowchart for an example computer-implemented method 600. The method 600 may be implemented by the computer systems of FIGS. 1A and 1B, or by computing systems having other suitable hardware and software configurations. The method 600 includes steps for implementing a sequence-labeling approach for extracting tasks from inked content that may be drawn onto a digital canvas by users.

At step 602, the method 600 may include receiving user input for inked content to a digital canvas. In one example, the digital canvas may be part of a conference application. Using the digital canvas, the user may select a digital writing modality, and draw on the digital canvas. The user input may be used to generate inked content on the digital canvas, that may then be processed in the following steps.

At 604, the method 600 may include processing the inked content to determine one or more writing regions. Each writing region includes recognized text and one or more document layout features associated with that writing region. The one or more document layout features may include a line break, a bullet point, or another type of document feature as described above, for example.

At 606, the method 600 may include tokenizing a target writing region of the one or more writing regions into a sequence of tokens. The sequence of tokens may include tokens representing recognized text and tokens representing the one or more document layout features. The document layout features may, for example, include bullet points, indents, page breaks, etc. The document layout features may be represented by tokens such as "</>", "<.>", etc.

At 608, the method 600 may include processing the sequence of tokens of the target writing region using a task extraction subsystem that operates on tokens representing both the recognized text and the one or more document layout features of the target writing region. In one example, the task extraction subsystem may be trained to correlate a token for the line break with a sentence boundary. In another example, the task extraction subsystem may be trained to correlate a token for the bullet point with a start of a task sentence.

The task extraction subsystem may be configured to segment the target writing region into one or more sentence segments and classify each of the one or more sentence segments as a task sentence or a non-task sentence. In one example, the tax extraction subsystem may include a pipeline of two or more machine learning models that includes at least a text sentence segmentation machine learning model and a binary task classification machine learning model, as described above.

In another example, the task extraction subsystem is a one-shot machine learning model that both segments and classifies the target writing region into one or more task sentences and non-task sentences. The one-shot model may implement two different approaches to sequence labeling. In a first approach, the method may include labeling one or more tokens of the sequence of tokens of the target writing region with one of at least three labels including a beginning of task sentence label, an inside of task sentence label, and an outside of task sentence label. The method may further include processing the labeled sequence of tokens to extract the one or more sentence segments that have been classified as task sentences.

In another approach, the method may include labeling one or more tokens of the sequence of tokens of the target writing region with one of at least three labels including a beginning of non-task sentence label, beginning of a task sentence label, and an inside of a sentence label. The method may further include processing the labeled sequence of tokens to extract the one or more sentence segments that have been classified as task sentences.

At 610, the method 600 may include extracting one or more sentence segments that have been classified as task sentences. The extracted task sentences may then be surfaces to user, such as, for example, by displaying the extracted task sentences in a GUI. In another example, the task sentences may be packaged in a data package that includes a task schema that is indigestible by other applications, such as, for example, a calendar, a to-do list, notes, etc.

The above systems and methods may be implemented to extract task sentences from inked content in a wide variety of contexts, including single user and multi-user digital canvas applications, networked and stand-alone computing environments, and conferencing, whiteboard, notepad, word processing and other application types. Extensions of the techniques described herein to recognized speech, as described above, are also contemplated.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
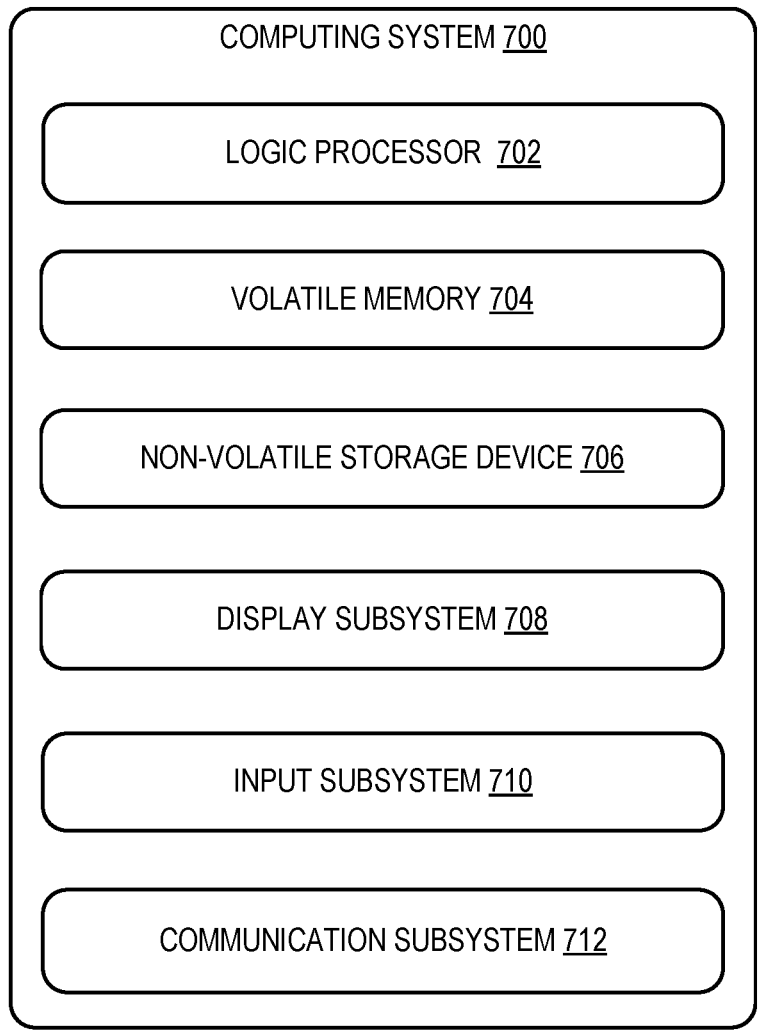
FIG. 7 shows a schematic view of an example computing environment in which the computer systems of FIGS. 1A and 1B may be enacted.

FIG. 7 schematically shows a non-limiting embodiment of a computing system 700 that can enact one or more of the methods and processes described above. Computing system 700 is shown in simplified form. Computing system 700 may embody the computer system 10 described above and illustrated in FIGS. 1A and 1B. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs discuss several aspects of the present disclosure. According to one aspect, a computer system is provided, comprising one or more processors configured to receive user input for inked content to a digital canvas, and process the inked content to determine one or more writing regions, each writing region including recognized text and one or more document layout features associated with that writing region. The one or more processors are further configured to tokenize a target writing region of the one or more writing regions into a sequence of tokens, the sequence of tokens including tokens representing recognized text and tokens representing the one or more document layout features. The one or more processors are further configured to process the sequence of tokens of the target writing region using a task extraction subsystem that operates on tokens representing both the recognized text and the one or more document layout features of the target writing region, the task extraction subsystem being configured to segment the target writing region into one or more sentence segments and classify each of the one or more sentence segments as a task sentence or a non-task sentence. The one or more processors are further configured to extract one or more sentence segments that have been classified as task sentences.

In this aspect, the document layout features may be selected from the group consisting of a line break, a bullet point, and an indent.

In this aspect, the one or more document layout features may include a line break, and the task extraction subsystem may be trained to correlate a token for the line break with a sentence boundary.

In this aspect, the one or more document layout features may include a bullet point, and the task extraction subsystem may be trained to correlate a token for the bullet point with a start of a task sentence.

In this aspect, the task extraction subsystem may include a pipeline of two or more machine learning models that includes at least a text sentence segmentation machine learning model and a binary task classification machine learning model. Further, the text sentence segmentation machine learning model may be trained to: (a) label one or more tokens of the sequence of tokens of the target writing region with one of at least two labels including a beginning of sentence label and an inside of sentence label; and (b) process the labeled sequence of tokens to extract one or more sentence segments. Further, the binary task classification machine learning model may be trained to classify each extracted one or more sentence segments as a task sentence or a non-task sentence.

In this aspect, alternatively, the task extraction subsystem may include a sequence labeling machine learning model, which is a one-shot machine learning model that both segments and classifies the target writing region into one or more task sentences and non-task sentences. Further, the sequence labeling machine learning model may be trained to: (a) label one or more tokens of the sequence of tokens of the target writing region with one of at least three labels including a beginning of task sentence label, an inside of task sentence label, and an outside of task sentence label; and (b) process the labeled sequence of tokens to extract the one or more sentence segments that have been classified as task sentences. In addition, the sequence labeling machine learning model may be trained to: (a) label one or more tokens of the sequence of tokens of the target writing region with one of at least three labels including a beginning of non-task sentence label, beginning of a task sentence label, and an inside of a sentence label; and (b) process the labeled sequence of tokens to extract the one or more sentence segments that have been classified as task sentences.

According to another aspect, a method is provided, comprising, at one or more processors of a computer system, receiving user input for inked content to a digital canvas, and processing the inked content to determine one or more writing regions, each writing region including recognized text and one or more document layout features associated with that writing region. The method further comprises tokenizing a target writing region of the one or more writing regions into a sequence of tokens, the sequence of tokens including tokens representing recognized text and tokens representing the one or more document layout features. The method further comprises processing the sequence of tokens of the target writing region using a task extraction subsystem that operates on tokens representing both the recognized text and the one or more document layout features of the target writing region, the task extraction subsystem being configured to segment the target writing region into one or more sentence segments and classify each of the one or more sentence segments as a task sentence or a non-task sentence. The method further comprises extracting one or more sentence segments that have been classified as task sentences.

In this aspect, the one or more document layout features may include a line break, and the task extraction subsystem may be trained to correlate a token for the line break with a sentence boundary.

In this aspect, the one or more document layout features may include a bullet point, and the task extraction subsystem may be trained to correlate a token for the bullet point with a start of a task sentence.

In this aspect, the task extraction subsystem may include a pipeline of two or more machine learning models that includes at least a text sentence segmentation machine learning model and a binary task classification machine learning model.

In this aspect, the task extraction subsystem may alternatively include a sequence labeling machine learning model, which is a one-shot machine learning model that both segments and classifies the target writing region into one or more task sentences and non-task sentences. Further, the sequence labeling machine learning model may be trained for: labeling one or more tokens of the sequence of tokens of the target writing region with one of at least three labels including a beginning of task sentence label, an inside of task sentence label, and an outside of task sentence label; and processing the labeled sequence of tokens to extract the one or more sentence segments that have been classified as task sentences. In addition, the sequence labeling machine learning model may be trained for: labeling one or more tokens of the sequence of tokens of the target writing region with one of at least three labels including a beginning of non-task sentence label, beginning of a task sentence label, and an inside of a sentence label; and processing the labeled sequence of tokens to extract the one or more sentence segments that have been classified as task sentences.

According to another aspect, a computer system is provided, comprising one or more processors configured to: execute a conference application that includes a graphical user interface that is presented to one or more users, wherein the graphical user interface includes a digital canvas that is configured to receive user input for inked content and present the inked content to the one or more users; process the inked content to determine one or more writing regions, each writing region including recognized text and one or more document layout features associated with that writing region; tokenize a target writing region of the one or more writing regions into a sequence of tokens, the sequence of tokens including tokens representing recognized text and tokens representing the one or more document layout features; process the sequence of tokens of the target writing region using a task extraction subsystem that operates on both the recognized text and the one or more document layout features of the target writing region, the task extraction subsystem being configured to segment the target writing region into one or more sentence segments and classify each of the one or more sentence segments as a task sentence or a non-task sentence; extract one or more sentence segments that have been classified as task sentences; and present the one or more sentence segments that have been classified as task sentences.

In this aspect, the one or more processors may be further configured to: generate data packages for the one or more sentence segments that have been classified as task sentences, the data packages including a task schema readable by other applications that indicates a content of the one or more sentence segments; and send the data packages to another application executed by the computer system. Further, the other application may be a type of application selected from the group consisting of a calendar application, an email application, a messaging application, a reminder application, a notes application, and a to-do list application.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
one or more processors configured to:
receive user input for inked content to a digital canvas;
process the inked content to determine one or more writing regions, each writing region including recognized text and one or more document layout features associated with that writing region;
tokenize a target writing region of the one or more writing regions into a sequence of tokens, the sequence of tokens including tokens representing recognized text and tokens representing the one or more document layout features;
process the sequence of tokens of the target writing region using a task extraction subsystem that operates on tokens representing both the recognized text and the one or more document layout features of the target writing region, the task extraction subsystem being configured to segment the target writing region into one or more sentence segments and classify each of the one or more sentence segments as a task sentence or a non-task sentence; and
extract one or more sentence segments that have been classified as task sentences.

2. The computer system of claim 1, wherein the document layout features are selected from the group consisting of a line break, a bullet point, and an indent.

3. The computer system of claim 1, wherein the one or more document layout features includes a line break, and
wherein the task extraction subsystem is trained to correlate a token for the line break with a sentence boundary.

4. The computer system of claim 1, wherein the one or more document layout features includes a bullet point, and
wherein the task extraction subsystem is trained to correlate a token for the bullet point with a start of a task sentence.

5. The computer system of claim 1, wherein the task extraction subsystem includes a pipeline of two or more machine learning models that includes at least a text sentence segmentation machine learning model and a binary task classification machine learning model.

6. The computer system of claim 5, wherein the text sentence segmentation machine learning model is trained to:
label one or more tokens of the sequence of tokens of the target writing region with one of at least two labels including a beginning of sentence label and an inside of sentence label; and
process the labeled sequence of tokens to extract one or more sentence segments.

7. The computer system of claim 6, wherein the binary task classification machine learning model is trained to classify each extracted one or more sentence segments as a task sentence or a non-task sentence.

8. The computer system of claim 1, wherein the task extraction subsystem includes a sequence labeling machine learning model, which is a one-shot machine learning model that both segments and classifies the target writing region into one or more task sentences and non-task sentences.

9. The computer system of claim 8, wherein the sequence labeling machine learning model is trained to:
label one or more tokens of the sequence of tokens of the target writing region with one of at least three labels including a beginning of task sentence label, an inside of task sentence label, and an outside of task sentence label; and
process the labeled sequence of tokens to extract the one or more sentence segments that have been classified as task sentences.

10. The computer system of claim 8, wherein the sequence labeling machine learning model is trained to:
label one or more tokens of the sequence of tokens of the target writing region with one of at least three labels including a beginning of non-task sentence label, beginning of a task sentence label, and an inside of a sentence label; and
process the labeled sequence of tokens to extract the one or more sentence segments that have been classified as task sentences.

11. A method comprising:
at one or more processors of a computer system:
receiving user input for inked content to a digital canvas;
processing the inked content to determine one or more writing regions, each writing region including recognized text and one or more document layout features associated with that writing region;
tokenizing a target writing region of the one or more writing regions into a sequence of tokens, the sequence of tokens including tokens representing recognized text and tokens representing the one or more document layout features;
processing the sequence of tokens of the target writing region using a task extraction subsystem that operates on tokens representing both the recognized text and the one or more document layout features of the target writing region, the task extraction subsystem being configured to segment the target writing region into one or more sentence segments and classify each of the one or more sentence segments as a task sentence or a non-task sentence; and
extracting one or more sentence segments that have been classified as task sentences.

12. The method of claim 11, wherein the one or more document layout features includes a line break, and
wherein the task extraction subsystem is trained to correlate a token for the line break with a sentence boundary.

13. The method of claim 11, wherein the one or more document layout features includes a bullet point, and
wherein the task extraction subsystem is trained to correlate a token for the bullet point with a start of a task sentence.

14. The method of claim 11, wherein the task extraction subsystem includes a pipeline of two or more machine learning models that includes at least a text sentence segmentation machine learning model and a binary task classification machine learning model.

15. The method of claim 11, wherein the task extraction subsystem includes a sequence labeling machine learning model, which is a one-shot machine learning model that both segments and classifies the target writing region into one or more task sentences and non-task sentences.

16. The method of claim 15, wherein the sequence labeling machine learning model is trained for:
labeling one or more tokens of the sequence of tokens of the target writing region with one of at least three labels including a beginning of task sentence label, an inside of task sentence label, and an outside of task sentence label; and
processing the labeled sequence of tokens to extract the one or more sentence segments that have been classified as task sentences.

17. The method of claim 15, wherein the sequence labeling machine learning model is trained for:
labeling one or more tokens of the sequence of tokens of the target writing region with one of at least three labels including a beginning of non-task sentence label, beginning of a task sentence label, and an inside of a sentence label; and
processing the labeled sequence of tokens to extract the one or more sentence segments that have been classified as task sentences.

18. A computer system comprising:
one or more processors configured to:
execute a conference application that includes a graphical user interface that is presented to one or more users, wherein the graphical user interface includes a digital canvas that is configured to receive user input for inked content and present the inked content to the one or more users;
process the inked content to determine one or more writing regions, each writing region including recognized text and one or more document layout features associated with that writing region;
tokenize a target writing region of the one or more writing regions into a sequence of tokens, the sequence of tokens including tokens representing recognized text and tokens representing the one or more document layout features
process the sequence of tokens of the target writing region using a task extraction subsystem that operates on both the recognized text and the one or more document layout features of the target writing region, the task extraction subsystem being configured to segment the target writing region into one or more sentence segments and classify each of the one or more sentence segments as a task sentence or a non-task sentence;

extract one or more sentence segments that have been classified as task sentences; and present the one or more sentence segments that have been classified as task sentences.

19. The computer system of claim 18, wherein the one or more processors are further configured to:

generate data packages for the one or more sentence segments that have been classified as task sentences, the data packages including a task schema readable by other applications that indicates a content of the one or more sentence segments; and send the data packages to another application executed by the computer system.

20. The computer system of claim 19, wherein the other application is a type of application selected from the group consisting of a calendar application, an email application, a messaging application, a reminder application, a notes application, and a to-do list application.

* * * * *